US011619950B2

United States Patent
Jiang et al.

(10) Patent No.: US 11,619,950 B2
(45) Date of Patent: Apr. 4, 2023

(54) SYSTEMS AND METHODS FOR PROJECTING A THREE-DIMENSIONAL (3D) SURFACE TO A TWO-DIMENSIONAL (2D) SURFACE FOR USE IN AUTONOMOUS DRIVING

(71) Applicant: TuSimple, Inc., San Diego, CA (US)

(72) Inventors: Minhao Jiang, San Diego, CA (US); Genmao Shi, San Diego, CA (US); Hsin Lu, San Diego, CA (US); Ziqi Liu, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 112 days.

(21) Appl. No.: 16/917,772

(22) Filed: Jun. 30, 2020

(65) Prior Publication Data
US 2021/0405647 A1    Dec. 30, 2021

(51) Int. Cl.
*G05D 1/02* (2020.01)

(52) U.S. Cl.
CPC ......... *G05D 1/0251* (2013.01); *G05D 1/0212* (2013.01)

(58) Field of Classification Search
CPC .................... G05D 1/0251; G05D 1/0212
See application file for complete search history.

(56) References Cited

U.S. PATENT DOCUMENTS

| | | | |
|---|---|---|---|
| 2017/0307883 A1* | 10/2017 | Yamasaki | G02B 27/01 |
| 2018/0278936 A1* | 9/2018 | Hendry | H04N 19/124 |
| 2019/0204105 A1 | 7/2019 | Milstein | |
| 2019/0272618 A1* | 9/2019 | Boyce | G06T 3/0062 |
| 2019/0311546 A1* | 10/2019 | Tay | G06T 5/50 |
| 2021/0019897 A1* | 1/2021 | Biswas | G06T 7/11 |
| 2021/0174139 A1* | 6/2021 | Ozog | G06V 20/56 |
| 2021/0256735 A1* | 8/2021 | Tourapis | H03M 7/70 |

* cited by examiner

*Primary Examiner* — Jess Whittington
(74) *Attorney, Agent, or Firm* — Paul Liu; Henrik Keshishian; Knobbe, Martens, Olson & Bear, LLP (57) ABSTRACT

Systems and methods for projecting a three-dimensional (3D) surface to a two-dimensional (2D) surface for use in autonomous driving are disclosed. In one aspect, a control system for an autonomous vehicle includes a processor and a computer-readable memory in communication with the processor and having stored thereon computer-executable instructions to cause the processor to: receive a 3D map including a plurality of objects, determine a base point in the 3D map, shift the objects in the 3D map based on the base point, project the objects in the shifted 3D map to a 2D map, and output the 2D map.

19 Claims, 6 Drawing Sheets

SYSTEMS AND METHODS FOR PROJECTING A THREE-DIMENSIONAL (3D) SURFACE TO A TWO-DIMENSIONAL (2D) SURFACE FOR USE IN AUTONOMOUS DRIVING

BACKGROUND

Technological Field

The described technology generally relates to systems and methods for autonomous driving, and more particularly, to projecting a three-dimensional (3D) surface to a two-dimensional (2D) surface.

Description of the Related Technology

In autonomous driving systems, an accurate map of the road surfaces available for driving of an autonomous or host vehicle is important to enable the systems to select a route for navigation. Maps that can be used for navigation may be define in 3D (e.g., using GPS coordinates to locate objects within the map) or 2D (e.g., using longitude and latitude coordinates to locate objects within the map). Since the Earth is approximately spherical, 2D maps may distort the locations of objects represented on the map, which can affect navigation of an autonomous vehicle using such a 2D map.

SUMMARY OF CERTAIN INVENTIVE ASPECTS

One inventive aspect is a control system for an autonomous vehicle, comprising: a processor; and a computer-readable memory in communication with the processor and having stored thereon computer-executable instructions to cause the processor to: receive a three-dimensional (3D) map comprising a plurality of objects, determine a base point in the 3D map, shift the objects in the 3D map based at least in part on the base point, project the objects in the shifted 3D map to a 2D map, and output the 2D map.

In some embodiments, the memory further has stored thereon computer-executable instructions to cause the processor to: set the base point as an origin of the shifted 3D map.

In certain embodiments, the memory further has stored thereon computer-executable instructions to cause the processor to: determine a vector representing a shift of the base point from an original location to the origin, wherein the shifting of the objects in the 3D map comprises shifting each of the objects by the vector.

In further embodiments, the projecting of the objects is performed using one of the following projection techniques: Mercator, Universal Transverse Mercator (UTM), Equirectangular, Cassini, cylindrical, and pseudocylindrical projections.

In yet further embodiments, the 2D map comprises an effective area in which distortions of locations of the objects is less than a predetermined value.

In some embodiments, the projecting of the objects is performed by a projection technique, and a shape and a size of the effective area are based on the projection technique used in the projecting of the objects.

In certain embodiments, the projection technique is a Mercator projection.

In further embodiments, the effective area comprises an area a predetermined distance from an equator defined with respect to the base point.

Another aspect is a non-transitory computer readable storage medium having stored thereon instructions that, when executed, cause at least one computing device to: receive a three-dimensional (3D) map comprising a plurality of objects; determine a base point in the 3D map; shift the objects in the 3D map based on the base point; project the objects in the shifted 3D map to a 2D map; and navigate an autonomous vehicle using the 2D map.

In some embodiments, the non-transitory computer readable storage medium further has stored thereon instructions that, when executed, cause at least one computing device to: receive a route for the navigating of the autonomous vehicle; and select the base point based on the route.

In certain embodiments, the non-transitory computer readable storage medium further has stored thereon instructions that, when executed, cause at least one computing device to: determine a midpoint between a current location and a destination of the route, wherein the midpoint is set as the base point.

In further embodiments, the non-transitory computer readable storage medium further has stored thereon instructions that, when executed, cause at least one computing device to: determine a midpoint along the route, wherein the midpoint is set as the base point.

In yet further embodiments, the non-transitory computer readable storage medium further has stored thereon instructions that, when executed, cause at least one computing device to: calculate a geometric value based on locations of at least two of the objects in the 2D map, wherein the navigating of the autonomous vehicle is based at least in part on the geometric value.

In some embodiments, the geometric value is a geodetic distance between the at least two of the objects.

In certain embodiments, the geometric value is an angle between the at least two of the objects.

In further embodiments, the calculating of the geometric value based on the locations of at least two of the objects in the 2D map is more efficient than a corresponding calculation for the at least two of the objects in the 3D map.

Yet another aspect is a method comprising: receiving a three-dimensional (3D) map comprising a plurality of objects; determining a base point in the 3D map; shifting the objects in the 3D map based on the base point; projecting the objects in the shifted 3D map to a 2D map; and navigating an autonomous vehicle using the 2D map.

In some embodiments, the method further comprises: receiving a route for the navigating of the autonomous vehicle, wherein the 2D map comprises an effective area in which distortions of locations of the objects is less than a predetermined value, and wherein the route is located within the effective area.

In certain embodiments, the method further comprises: selecting the base point based on the route such that the route is within the effective area.

In further embodiments, the base point is one of the following points: a midpoint between a current location and a destination, a midpoint along the route, the current location, or the destination.

DETAILED DESCRIPTION OF CERTAIN INVENTIVE EMBODIMENTS

Introduction to In-Vehicle Control Systems

In the following description, for purposes of explanation, numerous specific details are set forth in order to provide a thorough understanding of the various embodiments. It will be evident, however, to one of ordinary skill in the art that the various embodiments may be practiced without these specific details.

An example embodiment disclosed herein can be used in the context of an in-vehicle control system 150 in a vehicle ecosystem 101. In one example embodiment, an in-vehicle control system 150 with an image processing module 200 resident in a vehicle 105 can be configured like the architecture and ecosystem 101 illustrated in FIG. 1. However, it will be apparent to those of ordinary skill in the art that the image processing module 200 described herein can be implemented, configured, and used in a variety of other applications and systems as well.

Figure 1:
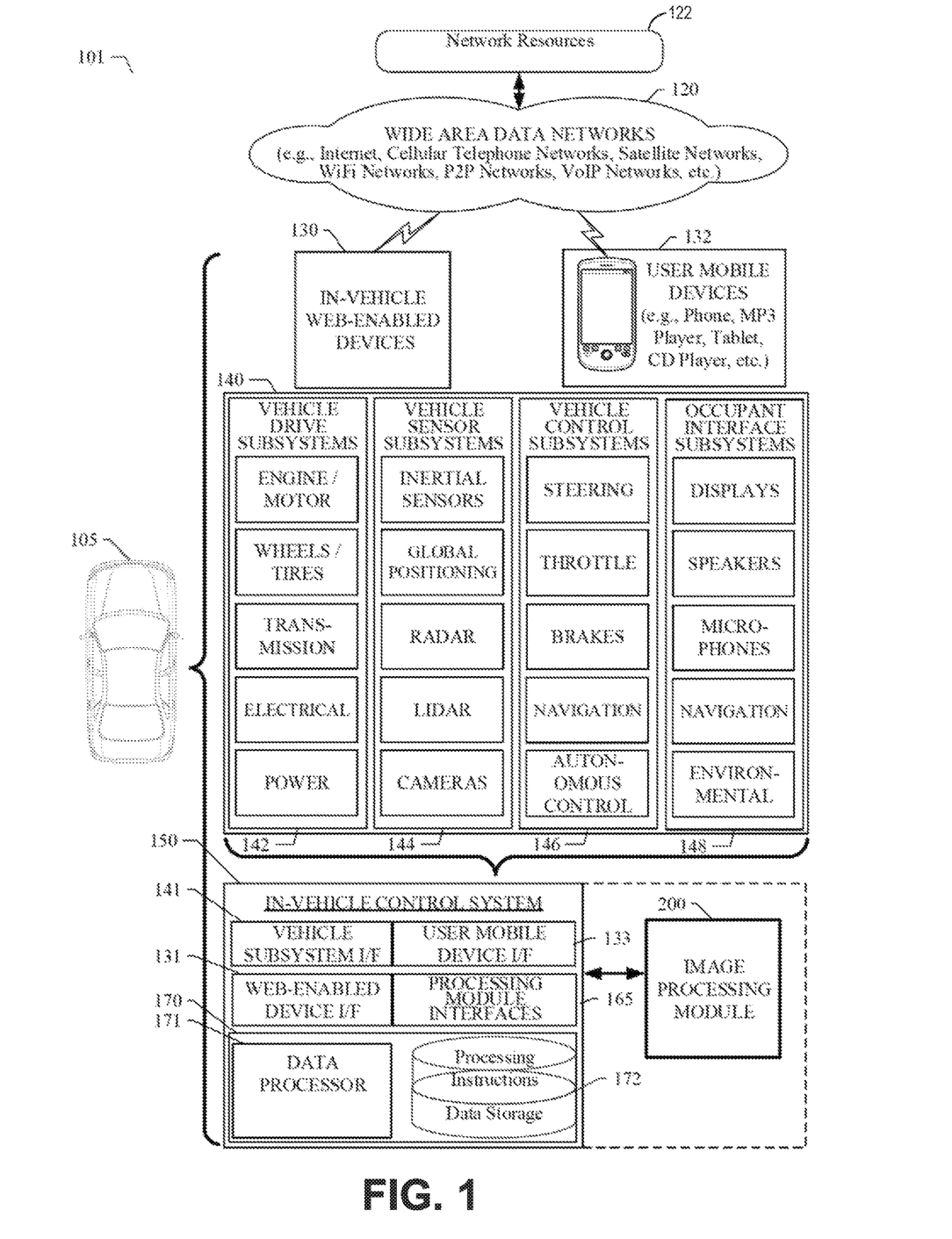
FIG. 1 is a block diagram illustrating an example ecosystem including an in-vehicle control system and an image processing module in accordance with aspects of this disclosure.

With continuing reference to FIG. 1, a block diagram illustrates an example ecosystem 101 in which an in-vehicle control system 150 and an image processing module 200 of an example embodiment can be implemented. These components are described in more detail below. Ecosystem 101 includes a variety of systems and components that can generate and/or deliver one or more sources of information/data and related services to the in-vehicle control system 150 and the image processing module 200, which can be installed in the vehicle 105. For example, a camera installed in the vehicle 105, as one of the devices of vehicle subsystems 140, can generate image and timing data that can be received by the in-vehicle control system 150. The in-vehicle control system 150 and the image processing module 200 executing therein can receive this image and timing data input. As described in more detail below, the image processing module 200 can process the image input and extract object features, which can be used by an autonomous vehicle control subsystem, as another one of the subsystems of vehicle subsystems 140. The autonomous vehicle control subsystem, for example, can use the real-time extracted object features to safely and efficiently navigate and control the vehicle 105 through a real world driving environment while avoiding obstacles and safely controlling the vehicle.

In an example embodiment as described herein, the in-vehicle control system 150 can be in data communication with a plurality of vehicle subsystems 140, all of which can reside in a user's vehicle 105. A vehicle subsystem interface 141 is provided to facilitate data communication between the in-vehicle control system 150 and the plurality of vehicle subsystems 140. The in-vehicle control system 150 can include a data processor 171 configured to execute the image processing module 200 for processing image data received from one or more of the vehicle subsystems 140. The data processor 171 can be combined with a data storage device 172 (e.g., a non-transitory computer-readable memory) as part of a computing system 170 in the in-vehicle control system 150. The data storage device 172 can be used to store data, processing parameters, and data processing instructions. For example, the data processing instructions may include a projection module 174 (shown in FIG. 3) configured to project 3D map data to 2D map data, as described herein.

A processing module interface 165 can be provided to facilitate data communications between the data processor 171 and the image processing module 200. In various example embodiments, a plurality of processing modules, configured similarly to image processing module 200, can be provided for execution by data processor 171. As shown by the dashed lines in FIG. 1, the image processing module 200 can be integrated into the in-vehicle control system 150, optionally downloaded to the in-vehicle control system 150, or deployed separately from the in-vehicle control system 150. In some implementations, the projection module 174 may be provided as a separate module similar to the image processing module 200.

The in-vehicle control system 150 can be configured to receive or transmit data to/from a wide-area network 120 and network resources 122 connected thereto. An in-vehicle web-enabled device 130 and/or a user mobile device 132 can be used to communicate via network 120. A web-enabled device interface 131 can be used by the in-vehicle control system 150 to facilitate data communication between the in-vehicle control system 150 and the network 120 via the in-vehicle web-enabled device 130. Similarly, a user mobile device interface 133 can be used by the in-vehicle control system 150 to facilitate data communication between the in-vehicle control system 150 and the network 120 via the user mobile device 132. In this manner, the in-vehicle control system 150 can obtain real-time access to network resources 122 via network 120. The network resources 122 can be used to obtain processing modules for execution by data processor 171, data content to train internal neural networks, system parameters, or other data.

The ecosystem 101 can include a wide area data network 120. The network 120 represents one or more conventional wide area data networks, such as the Internet, a cellular telephone network, satellite network, pager network, a wireless broadcast network, gaming network, WiFi network, peer-to-peer network, Voice over IP (VoIP) network, etc. One or more of these networks 120 can be used to connect a user or client system with network resources 122, such as websites, servers, central control sites, or the like. The network resources 122 can generate and/or distribute data, which can be received in vehicle 105 via in-vehicle web-enabled devices 130 or user mobile devices 132. The network resources 122 can also host network cloud services, which can support the functionality used to compute or assist in processing image input or image input analysis. Antennas can serve to connect the in-vehicle control system 150 and the image processing module 200 with the data network 120 via cellular, satellite, radio, or other conventional signal reception mechanisms. Such cellular data networks are currently available (e.g., Verizon™, AT&T™, T-Mobile™, etc.). Such satellite-based data or content networks are also currently available (e.g., SiriusXM™, HughesNet™, etc.). The broadcast networks, such as AM/FM radio networks, pager networks, UHF networks, gaming networks, WiFi networks, peer-to-peer networks, Voice over IP (VoIP) networks, and the like are also available. Thus, the in-vehicle control system 150 and the image processing module 200 can receive web-based data or content via an in-vehicle web-enabled device interface 131, which can be used to connect with the in-vehicle web-enabled device receiver 130 and network 120. In this manner, the in-vehicle control system 150 and the image processing module 200 can support a variety of network-connectable in-vehicle devices and systems from within a vehicle 105.

As shown in FIG. 1, the in-vehicle control system 150 and the image processing module 200 can also receive data, image processing control parameters, and training content from user mobile devices 132, which can be located inside or proximately to the vehicle 105. The user mobile devices 132 can represent standard mobile devices, such as cellular phones, smartphones, personal digital assistants (PDA's), MP3 players, tablet computing devices (e.g., iPad™), laptop computers, CD players, and other mobile devices, which can produce, receive, and/or deliver data, image processing control parameters, and content for the in-vehicle control system 150 and the image processing module 200. As shown in FIG. 1, the mobile devices 132 can also be in data communication with the network cloud 120. The mobile devices 132 can source data and content from internal memory components of the mobile devices 132 themselves or from network resources 122 via network 120. Additionally, mobile devices 132 can themselves include a GPS data receiver, accelerometers, WiFi triangulation, or other geo-location sensors or components in the mobile device, which can be used to determine the real-time geo-location of the user (via the mobile device) at any moment in time. In any case, the in-vehicle control system 150 and the image processing module 200 can receive data from the mobile devices 132 as shown in FIG. 1.

Referring still to FIG. 1, the example embodiment of ecosystem 101 can include vehicle operational subsystems 140. For embodiments that are implemented in a vehicle 105, many standard vehicles include operational subsystems, such as electronic control units (ECUs), supporting monitoring/control subsystems for the engine, brakes, transmission, electrical system, emissions system, interior environment, and the like. For example, data signals communicated from the vehicle operational subsystems 140 (e.g., ECUs of the vehicle 105) to the in-vehicle control system 150 via vehicle subsystem interface 141 may include information about the state of one or more of the components or subsystems of the vehicle 105. In particular, the data signals, which can be communicated from the vehicle operational subsystems 140 to a Controller Area Network (CAN) bus of the vehicle 105, can be received and processed by the in-vehicle control system 150 via vehicle subsystem interface 141. Embodiments of the systems and methods described herein can be used with substantially any mechanized system that uses a CAN bus or similar data communications bus as defined herein, including, but not limited to, industrial equipment, boats, trucks, machinery, or automobiles; thus, the term "vehicle" as used herein can include any such mechanized systems. Embodiments of the systems and methods described herein can also be used with any systems employing some form of network data communications; however, such network communications are not required.

Referring still to FIG. 1, the example embodiment of ecosystem 101, and the vehicle operational subsystems 140 therein, can include a variety of vehicle subsystems in support of the operation of vehicle 105. In general, the vehicle 105 may take the form of a car, truck, motorcycle, bus, boat, airplane, helicopter, lawn mower, earth mover, snowmobile, aircraft, recreational vehicle, amusement park vehicle, farm equipment, construction equipment, tram, golf cart, train, and trolley, for example. Other vehicles are possible as well. The vehicle 105 may be configured to operate fully or partially in an autonomous mode. For example, the vehicle 105 may control itself while in the autonomous mode, and may be operable to determine a current state of the vehicle and its environment, determine a predicted behavior of at least one other vehicle in the environment, determine a confidence level that may correspond to a likelihood of the at least one other vehicle to perform the predicted behavior, and control the vehicle 105 based on the determined information. While in autonomous mode, the vehicle 105 may be configured to operate without human interaction.

The vehicle 105 may include various vehicle subsystems such as a vehicle drive subsystem 142, vehicle sensor subsystem 144, vehicle control subsystem 146, and occupant interface subsystem 148. As described above, the vehicle 105 may also include the in-vehicle control system 150, the computing system 170, and the image processing module 200. The vehicle 105 may include more or fewer subsystems and each subsystem could include multiple elements. Further, each of the subsystems and elements of vehicle 105 could be interconnected. Thus, one or more of the described functions of the vehicle 105 may be divided up into additional functional or physical components or combined into fewer functional or physical components. In some further examples, additional functional and physical components may be added to the examples illustrated by FIG. 1.

The vehicle drive subsystem 142 may include components operable to provide powered motion for the vehicle 105. In an example embodiment, the vehicle drive subsystem 142 may include an engine or motor, wheels/tires, a transmission, an electrical subsystem, and a power source. The engine or motor may be any combination of an internal combustion engine, an electric motor, steam engine, fuel cell engine, propane engine, or other types of engines or motors. In some example embodiments, the engine may be configured to convert a power source into mechanical energy. In some example embodiments, the vehicle drive subsystem 142 may include multiple types of engines or motors. For instance, a gas-electric hybrid car could include a gasoline engine and an electric motor. Other examples are possible.

The wheels of a given vehicle may represent at least one wheel that is fixedly coupled to the transmission and at least one tire coupled to a rim of the wheel that could make contact with the driving surface. The wheels may include a combination of metal and rubber, or another combination of materials. The transmission may include elements that are operable to transmit mechanical power from the engine to the wheels. For this purpose, the transmission could include a gearbox, a clutch, a differential, and drive shafts. The transmission may include other elements as well. The drive shafts may include one or more axles that could be coupled to one or more wheels. The electrical system may include elements that are operable to transfer and control electrical signals in the vehicle 105. These electrical signals can be used to activate lights, servos, electrical motors, and other electrically driven or controlled devices of the vehicle 105. The power source may represent a source of energy that may, in full or in part, power the engine or motor. That is, the engine or motor could be configured to convert the power source into mechanical energy. Examples of power sources include gasoline, diesel, other petroleum-based fuels, propane, other compressed gas-based fuels, ethanol, fuel cell, solar panels, batteries, and other sources of electrical power. The power source could additionally or alternatively include any combination of fuel tanks, batteries, capacitors, or flywheels. The power source may also provide energy for other subsystems of the vehicle 105.

The vehicle sensor subsystem 144 may include a number of sensors configured to sense information about an environment or condition of the vehicle 105. For example, the vehicle sensor subsystem 144 may include an inertial measurement unit (IMU), a Global Positioning System (GPS) transceiver, a RADAR unit, a laser range finder/LIDAR unit, and one or more cameras or image capture devices. The optical sensor may be embodied as a LiDAR detector or a camera (e.g., a conventional visible wavelength camera). The vehicle sensor subsystem 144 may also include sensors configured to monitor internal systems of the vehicle 105 (e.g., an O2 monitor, a fuel gauge, an engine oil temperature). Other sensors are possible as well. One or more of the sensors included in the vehicle sensor subsystem 144 may be configured to be actuated separately or collectively in order to modify a position, an orientation, or both, of the one or more sensors.

The IMU may include any combination of sensors (e.g., accelerometers and gyroscopes) configured to sense position and orientation changes of the vehicle 105 based on inertial acceleration. The GPS transceiver may be any sensor configured to estimate a geographic location of the vehicle 105. For this purpose, the GPS transceiver may include a receiver/transmitter operable to provide information regarding the position of the vehicle 105 with respect to the Earth. The RADAR unit may represent a system that utilizes radio signals to sense objects within the local environment of the vehicle 105. In some embodiments, in addition to sensing the objects, the RADAR unit may additionally be configured to sense the speed and the heading of the objects proximate to the vehicle 105. The laser range finder or LIDAR unit may be any sensor configured to sense objects in the environment in which the vehicle 105 is located using lasers. In an example embodiment, the laser range finder/LIDAR unit may include one or more laser sources, a laser scanner, and one or more detectors, among other system components. The laser range finder/LIDAR unit can be configured to operate in a coherent (e.g., using heterodyne detection) or an incoherent detection mode. The cameras may include one or more devices configured to capture a plurality of images of the environment of the vehicle 105. The cameras may be still image cameras or motion video cameras.

The vehicle control system 146 may be configured to control operation of the vehicle 105 and its components. Accordingly, the vehicle control system 146 may include various elements such as a steering unit, a throttle, a brake unit, a navigation unit, and an autonomous control unit.

The steering unit may represent any combination of mechanisms that may be operable to adjust the heading of vehicle 105. The throttle may be configured to control, for instance, the operating speed of the engine and, in turn, control the speed of the vehicle 105. The brake unit can include any combination of mechanisms configured to decelerate the vehicle 105. The brake unit can use friction to slow the wheels in a standard manner. In other embodiments, the brake unit may convert the kinetic energy of the wheels to electric current. The brake unit may take other forms as well. The navigation unit may be any system configured to determine a driving path or route for the vehicle 105. The navigation unit may additionally be configured to update the driving path dynamically while the vehicle 105 is in operation. In some embodiments, the navigation unit may be configured to incorporate data from the image processing module 200, the GPS transceiver, and one or more predetermined maps so as to determine the driving path for the vehicle 105. The autonomous control unit may represent a control system configured to identify, evaluate, and avoid or otherwise negotiate potential obstacles in the environment of the vehicle 105. In general, the autonomous control unit may be configured to control the vehicle 105 for operation without a driver or to provide driver assistance in controlling the vehicle 105. In some embodiments, the autonomous control unit may be configured to incorporate data from the image processing module 200, the GPS transceiver, the RADAR, the LIDAR, the cameras, and other vehicle subsystems to determine the driving path or trajectory for the vehicle 105. The vehicle control system 146 may additionally or alternatively include components other than those shown and described.

Occupant interface subsystems 148 may be configured to allow interaction between the vehicle 105 and external sensors, other vehicles, other computer systems, and/or an occupant or user of vehicle 105. For example, the occupant interface subsystems 148 may include standard visual display devices (e.g., plasma displays, liquid crystal displays (LCDs), touchscreen displays, heads-up displays, or the like), speakers or other audio output devices, microphones or other audio input devices, navigation interfaces, and interfaces for controlling the internal environment (e.g., temperature, fan, etc.) of the vehicle 105.

In an example embodiment, the occupant interface subsystems 148 may provide, for instance, capabilities for a user/occupant of the vehicle 105 to interact with the other vehicle subsystems. The visual display devices may provide information to a user of the vehicle 105. The user interface devices can also be operable to accept input from the user via a touchscreen. The touchscreen may be configured to sense at least one of a position and a movement of a user's finger via capacitive sensing, resistance sensing, or a surface acoustic wave process, among other possibilities. The touchscreen may be capable of sensing finger movement in a direction parallel or planar to the touchscreen surface, in a direction normal to the touchscreen surface, or both, and may also be capable of sensing a level of pressure applied to the touchscreen surface. The touchscreen may be formed of one or more translucent or transparent insulating layers and one or more translucent or transparent conducting layers. The touchscreen may take other forms as well.

In other instances, the occupant interface subsystems 148 may provide capabilities for the vehicle 105 to communicate with devices within its environment. The microphone may be configured to receive audio (e.g., a voice command or other audio input) from a user of the vehicle 105. Similarly, the speakers may be configured to output audio to a user of the vehicle 105. In one example embodiment, the occupant interface subsystems 148 may be configured to wirelessly communicate with one or more devices directly or via a communication network. For example, a wireless communication system could use 3G cellular communication, such as CDMA, EVDO, GSM/GPRS, 4G cellular communication, such as WiMAX or LTE, or 5G cellular communication. Alternatively, the wireless communication system may communicate with a wireless local area network (WLAN), for example, using WIFI®. In some embodiments, the wireless communication system 146 may communicate directly with a device, for example, using an infrared link, BLUETOOTH®, or ZIGBEE®. Other wireless protocols, such as various vehicular communication systems, are possible within the context of the disclosure. For example, the wireless communication system may include one or more dedicated short range communications (DSRC) devices that may include public or private data communications between vehicles and/or roadside stations.

Many or all of the functions of the vehicle 105 can be controlled by the computing system 170. The computing system 170 may include at least one data processor 171 (which can include at least one microprocessor) that executes processing instructions stored in a non-transitory computer readable medium, such as the data storage device 172. The computing system 170 may also represent a plurality of computing devices that may serve to control individual components or subsystems of the vehicle 105 in a distributed fashion. In some embodiments, the data storage device 172 may contain processing instructions (e.g., program logic) executable by the data processor 171 to perform various functions of the vehicle 105, including those described herein in connection with the drawings. The data storage device 172 may contain additional instructions as well, including instructions to transmit data to, receive data from, interact with, or control one or more of the vehicle drive subsystem 142, the vehicle sensor subsystem 144, the vehicle control subsystem 146, and the occupant interface subsystems 148.

In addition to the processing instructions, the data storage device 172 may store data such as image processing parameters, training data, maps 302, 304 (shown in FIGS. 2A-2C), and path information, among other information. Such information may be used by the vehicle 105 and the computing system 170 during the operation of the vehicle 105 in the autonomous, semi-autonomous, and/or manual modes.

The vehicle 105 may include a user interface for providing information to or receiving input from a user or occupant of the vehicle 105. The user interface may control or enable control of the content and the layout of interactive images that may be displayed on a display device. Further, the user interface may include one or more input/output devices within the set of occupant interface subsystems 148, such as the display device, the speakers, the microphones, or a wireless communication system.

The computing system 170 may control the function of the vehicle 105 based on inputs received from various vehicle subsystems (e.g., the vehicle drive subsystem 142, the vehicle sensor subsystem 144, and the vehicle control subsystem 146), as well as from the occupant interface subsystem 148. For example, the computing system 170 may use input from the vehicle control system 146 in order to control the steering unit to avoid an obstacle detected by the vehicle sensor subsystem 144 and the image processing module 200, move in a controlled manner, or follow a path or trajectory based on output generated by the image processing module 200. In an example embodiment, the computing system 170 can be operable to provide control over many aspects of the vehicle 105 and its subsystems.

Although FIG. 1 shows various components of vehicle 105, e.g., vehicle subsystems 140, computing system 170, data storage device 172, and image processing module 200, as being integrated into the vehicle 105, one or more of these components could be mounted or associated separately from the vehicle 105. For example, data storage device 172 could, in part or in full, exist separate from the vehicle 105. Thus, the vehicle 105 could be provided in the form of device elements that may be located separately or together. The device elements that make up vehicle 105 could be communicatively coupled together in a wired or wireless fashion.

Additionally, other data and/or content (denoted herein as ancillary data) can be obtained from local and/or remote sources by the in-vehicle control system 150 as described above. The ancillary data can be used to augment, modify, or train the operation of the image processing module 200 based on a variety of factors including, the context in which the user is operating the vehicle (e.g., the location of the vehicle, the specified destination, direction of travel, speed, the time of day, the status of the vehicle, etc.), and a variety of other data obtainable from the variety of sources, local and remote, as described herein.

In a particular embodiment, the in-vehicle control system 150 and the image processing module 200 can be implemented as in-vehicle components of vehicle 105. In various example embodiments, the in-vehicle control system 150 and the image processing module 200 in data communication therewith can be implemented as integrated components or as separate components. For example, the image processing module 200 can be included as a set of instructions stored in a non-transitory computer readable medium, such as the data storage device 172, for causing the data processor 171 to perform various image processing functionality. In an example embodiment, the software components of the in-vehicle control system 150 and/or the image processing module 200 can be dynamically upgraded, modified, and/or augmented by use of the data connection with the mobile devices 132 and/or the network resources 122 via network 120. The in-vehicle control system 150 can periodically query a mobile device 132 or a network resource 122 for updates or updates can be pushed to the in-vehicle control system 150.

Systems and Methods for 3D to 2D Map Projection

In the various example embodiments disclosed herein, a system and method are provided for projecting a 3D map to a 2D map, which can be employed in the context of autonomous vehicles 105 in some embodiments. Embodiments of the autonomous vehicle 105 include a semi-truck having a tractor and at least one trailer, an articulated bus, a train, a passenger car, etc.

Autonomous vehicles 105 can use maps 302, 304 of roadways for a number of different tasks related to control of the autonomous vehicle 105. For example, the navigation module of the vehicle control subsystems 146 can use the map 302, 304 in selecting a route between a current location and a destination for navigation. As another example, the vehicle sensor subsystems 144 can use the map 302, 304 to determine the distance(s) between the autonomous vehicle 105 and object(s) detected using the vehicle sensors (e.g., radar, lidar, camera(s), etc.). As used herein, an object may refer to any physical body that can be sensed by the vehicle sensors including, for example, roads, lane markers, road signs, buildings, traffic cones, other vehicles, pedestrians, bridges, etc.

In general, the autonomous vehicle 105 subsystems 142-148 may use the map 302, 304 when localizing object(s) (e.g., the autonomous vehicle 105, other vehicles, road signs, lane dividers, etc.) within the environment. For example, the in-vehicle control system 150 may receive a signal from the GPS transceiver indicative of the location of the autonomous vehicle 105. In certain circumstances, the in-vehicle control system 150 can improve the accuracy of the GPS signal by using additional information received from other sensors (e.g., inertial sensors, radar, lidar, cameras, etc.). In one example, the in-vehicle control system 150 can detect one or more objects in an image captured by the cameras which may also be represented in the map 302, 304. The in-vehicle control system 150 may calculate the distance between these two objects in the map 302, 304 to aid in supplementing the determined location of the autonomous vehicle 105 using the GPS signal.

Figure 2A:
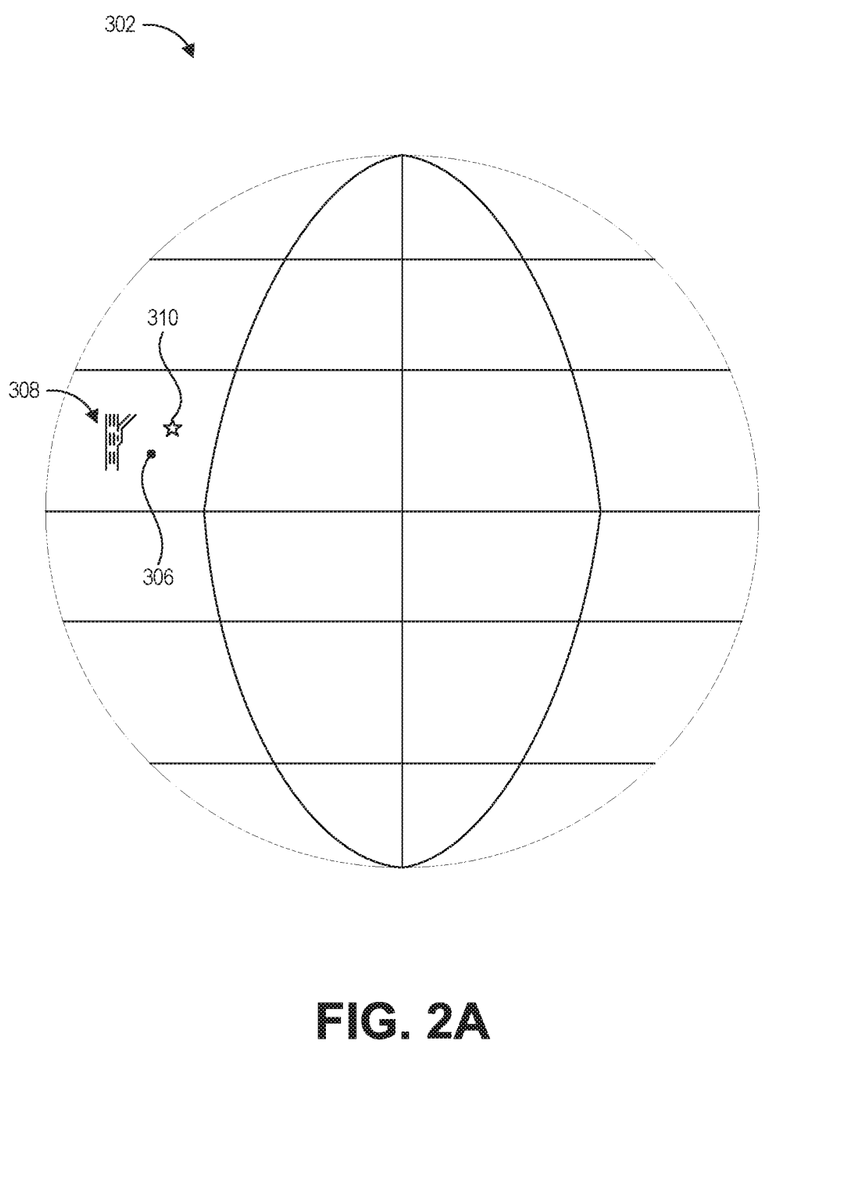
FIGS. 2A-2C provide an example projection from a 3D map to a 2D map in accordance with aspects of this disclosure.
Figure 2B:
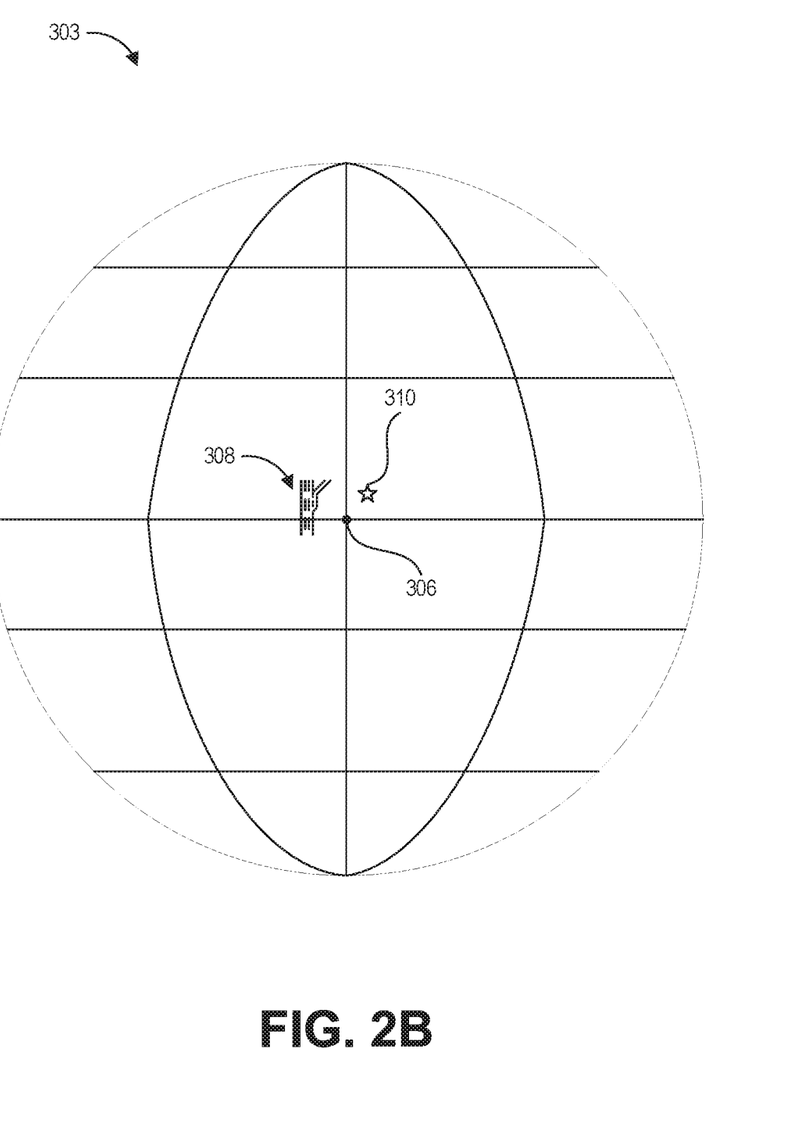
Figure 2C:
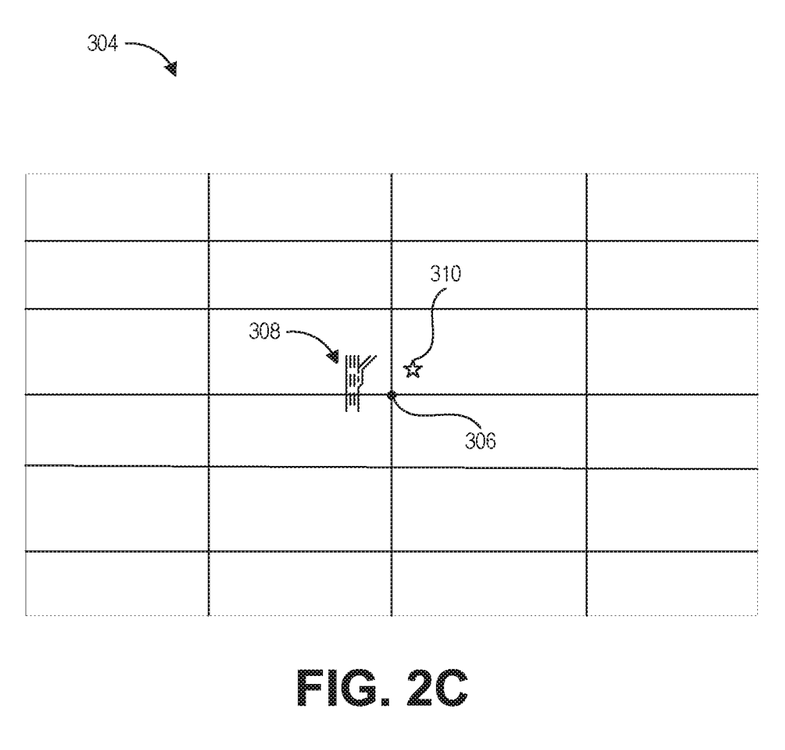

FIGS. 2A-2C provide an example projection from the 3D map 302 to the 2D map 304 in accordance with aspects of this disclosure. In particular, FIG. 2A illustrates the 3D map 302, FIG. 2B illustrates a shifted 3D map 303, and FIG. 2C illustrates the 2D map 304. While the 3D map 302 may provide the most accurate representation of the location of objects when compared to the real-world, it may be more computationally complex to perform certain calculations using the 3D map 302 comparted to the 2D map 304. As shown in FIG. 2A, the 3D map 302 may include a base point 306 and a plurality of objects 308 and 310. For example, the in-vehicle control system 150 of the autonomous vehicle 105 may calculate the geodetic distance between two objects 308, 310, calculate the angles between a plurality of object(s) 308, 310, or perform other geometric calculations to aid in driving of the autonomous vehicle 105. Such calculations are typically more computationally costly using the 3D map 302 than using the 2D map 304. For example, calculating a distance between two points on a spherical surface may involve the use of a triangulation function, which is relatively slow and complicated compared to calculating the distance between two points on a 2D surface, which can be calculated faster and use less complex equations.

With reference to FIG. 2A, the 3D map 302 may represent objects 308, 310 relevant to driving of the autonomous vehicle 105 (e.g., roadways, intersections, lane markings, signage, landmarks, etc.) on the surface of a sphere approximating the Earth. In some implementations, the location of each object 308, 310 within the 3D map 302 can be represented using GPS coordinates. As shown in FIG. 2C, the 2D map 304 may represent the objects 308, 310 relevant to driving of the autonomous vehicle 105 on a 2D surface projected from a 3D representation of the Earth. For example, the 2D map 304 can be constructed by projecting the objects 308, 310 from the 3D map 302 onto the 2D surface of the 2D map 304. There are a number of different techniques that can be used to project the 3D map 302 to the 2D map 304, for example, Mercator, Universal Transverse Mercator (UTM), Equirectangular, Cassini, cylindrical, and pseudocylindrical projections, etc.

However, 2D maps 304 may have a disadvantage compared to 3D maps 302 when representing a spherical surface, such as the surface of the Earth. For example, the shapes and/or sizes of the layout of objects 308, 310 projected to the 2D map 304 may be distorted when projecting the curved surface of the Earth to the 2D surface of the 2D map 304. Such distortions can affect the calculation of various geometric properties of the 2D map 304 that may be used by the in-vehicle control system 141 when controlling the autonomous vehicle 105. For example, the calculation of the geodetic distance between two objects 308, 310 and/or the calculation of the angles between a plurality of object(s) 308, 310 can be subject to such distortion.

For example, when the Mercator projection is used to project the 3D map 302 to the 2D map 304, the distortion of shapes and sizes of the layout of objects 308, 310 is more pronounced the further the object(s) 308, 310 are located from the equator. Thus, when objects 308, 310 used for a given geometric calculation are located closer to the equator, the effects of the 2D projection of the 3D map 302 to the 3D map 304 can be reduced.

Certain techniques for reducing distortion when projecting the 3D map 302 to the 2D map 304 may involve dividing the entire 3D map (e.g., the Earth) into sections and making individual projections for each section of the divided map. One such example is the Universal Transverse Mercator (UTM) projection. However, objects 308, 310 which are located in different sections of the divided map cannot be calculated together, preventing such geometric calculations over long distances. For example, using such techniques, the geodetic distance between two objects 308, 310 located in different sections cannot be calculated.

Figure 3:
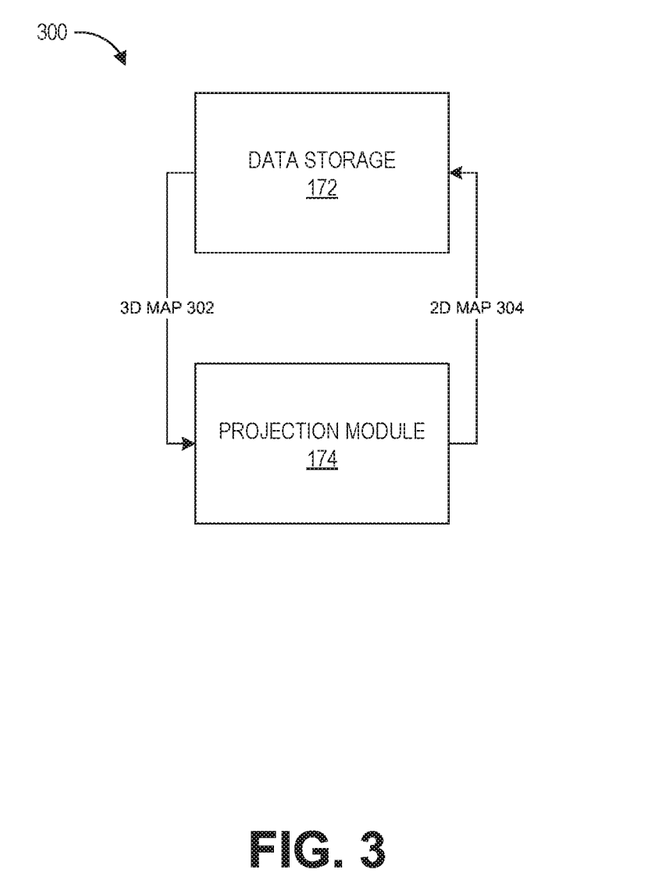
FIG. 3 illustrates an example subsystem which can be used to project a 3D map to a 2D map in accordance with aspects of this disclosure.

Aspects of this disclosure relate to systems and methods that can be used to project the 3D map 302 to the 2D map 304 while reducing distortion effects within an effective area including a route for which the autonomous vehicle 105 is to be driven, which may involve generating the shifted 3D map 303 illustrated in FIG. 2B as described herein. FIG. 3 illustrates an example subsystem 300 which can be used to project the 3D map 302 to the 2D map 304 in accordance with aspects of this disclosure. The subsystem 300 can be included as a part of the in-vehicle control system 150 of an autonomous vehicle and can include data storage 172 and a projection module 174 which is configured to be executed by a processor such as data processor 171. The data storage 172 can store the 3D map 302 including a plurality of objects 308, 310 such as roadways that can be navigated by the autonomous vehicle 105.

As described above, the 3D map 302 may store the locations of each of the objects 308, 310 in the 3D map 302 as located on the surface of a sphere approximating the Earth. The projection module 174 can project the objects 308, 310 from the 3D map 302 to a 2D surface to create the 2D map 304. Certain aspects of the projection performed by the projection module 174 are illustrated in FIG. 4.

Figure 4:
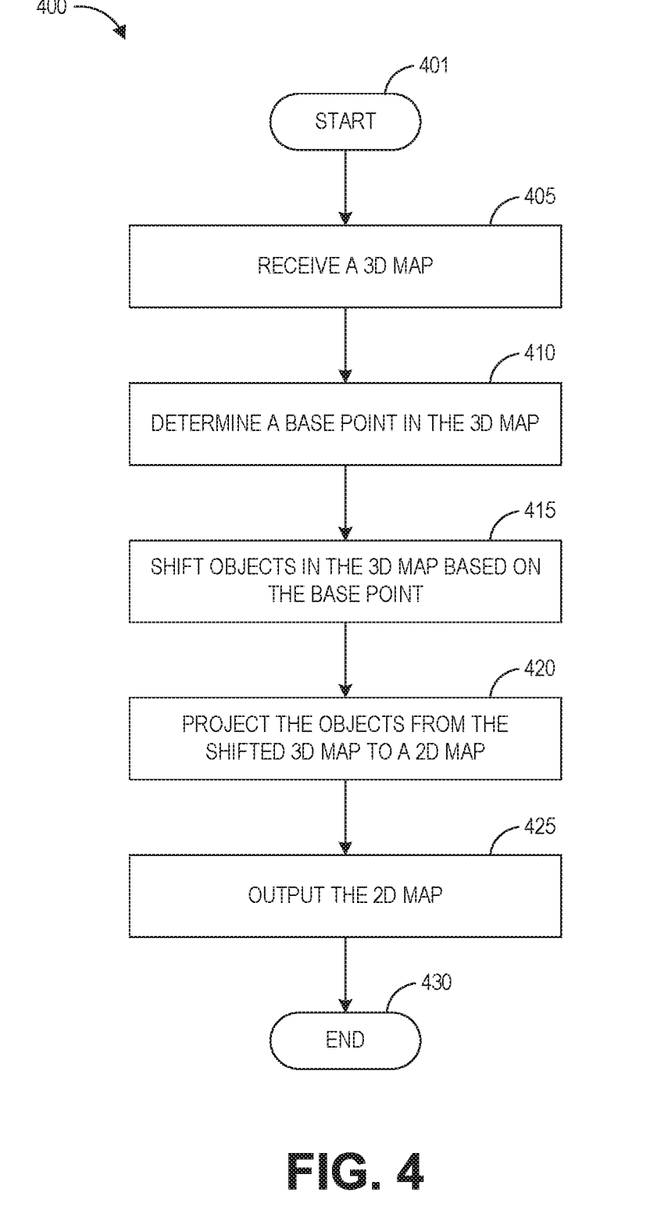
FIG. 4 illustrates an example method for projecting a 3D map to a 2D map in accordance with aspects of this disclosure.

FIG. 4 illustrates an example method 400 for projecting the 3D map 302 to the 2D map 304 in accordance with aspects of this disclosure. In some implementations, certain blocks of the method 400 may be performed by the projection module 174, or any other module executed by a processor on the autonomous vehicle 105 or the network resources 122. For simplicity, the method 400 will be described as performed by the projection module 174.

The method 400 begins at block 401. At block 405, the projection module 174 receives the 3D map 302. For example, the projection module 174 can receive the 3D map 302 from the data storage 172, or in other implementations, from network resources 122 via the network 120.

At block 410, the projection module 174 determines the base point 306 in the 3D map 302. As described above, the projection of objects 308, 310 from the 3D map 302 to the 2D map 304 may introduce distortions (e.g., shape and/or size distortions), which may be more pronounced in certain areas of the projection than others. For example, when using a Mercator projection, the shapes and sizes of the layout of objects 308, 310 in the 2D map 304 may experience greater amounts of distortion for objects 308, 310 located farther from the equator. However, when driving the autonomous vehicle 105 along a given route from a current location to a destination using the 2D map 304, the distortion of objects 308, 310 which are located further than a predetermined distance, e.g., effective area away from the route, may not affect the in-vehicle control system's 150 ability to drive the autonomous vehicle 105. For example, in some embodiments, the predetermined distance may be about 50 miles and the effective area may be an area that extends about 50 miles from the route in all directions. However, in other embodiments, the predetermined distance may be greater than or less than 50 miles and the effective area may extend by greater than or less than 50 miles from the route. In contrast, distortions that are located along the route and/or within the predetermined distance from the route may affect certain geometric calculations based on the 2D map 304, which could decrease the accuracy of such calculations.

The size and shape of the effective area (e.g., the area in which distortions are acceptable) may be based on a number of factors, including the technique used for projecting objects 308, 310 from the 3D map 302 to the 2D map 304, the amount of accuracy required for a given geometric calculation, etc. For example, when using a Mercator projection, there may be relatively less distortion in the projection the closer an object 308, 310 is located to the equator (or a latitude of 0 with respect to the base point 306). Thus, the effective area for a Mercator projection may include an area bounded by a predetermined positive and negative latitude with respect to the base point 306. However, other projection techniques may introduce distortion in different ways, and thus, the effective area may have a different shape depending on the projection technique used.

By properly selecting the base point 306, the projection module 174 can reduce the likelihood that any distortions introduced in the projection of objects 308, 310 from the 3D map 302 to the 2D map 304 will affect the geometric calculations used by the in-vehicle control system 150 in driving the autonomous vehicle 105. For example, the projection module 174 may select any point within a predetermined distance of the route as the base point 306 to be used for the projection of objects 308, 310 from the 3D map 302 to the 2D map 304. In certain embodiments, the base point 306 can be selected from among the following: a midpoint between the current location and the destination, a midpoint along the route, the current location, or the destination.

At block 415, the projection module 174 shifts all objects 308, 310 in the 3D map 302 based on the base point 306, as shown in the shifted 3D map 303. In some implementations, the projection module 174 can shift the location of all objects 308, 310 in the 3D map 302 such that the base point 306 is located at the origin (0, 0) of the shifted 3D map 303. For example, in some embodiments, the location of each object 308, 310 within the 3D map 302 is defined by a set of values, which can include a longitude and a latitude. The longitude and the latitude for each object 308, 310 within the 3D map 302 can be shifted such that the base point 306 is located at the origin of the shifted 3D map 303. For example, the coordinates for each object 308, 310 within the 3D map 302 may be shifted by a vector substantially equal to a vector between the original coordinates of the base point 306 and the new origin (0, 0). That is, each object 308, 310 in the 3D map 302 may be shifted by the same amount and in the same direction as the base point 306 from the original location of the base point 306 to the origin.

At block 420, the projection module 174 projects all objects 308, 310 from the shifted 3D map 303 to the 2D map 304. According to certain aspects, the projection can be performed using a projection technique such as Mercator, Universal Transverse Mercator (UTM), Equirectangular, Cassini, cylindrical, pseudocylindrical projections, etc. Depending on the particular projection used, the distortion of the location objects 308, 310 within a predetermined distance of the base point 306 may be lower than the distortion of the location of objects 308, 310 located further from the base point 306. Thus, due to the shifting of the 3D map 302 in block 415 and the determination of the base point 306 in block 410 to be less than a predetermined distance from the route, the distortion of objects 308, 310 which may be encountered by the autonomous vehicle 105 while driven along the route can be reduced. At block 425, the projection module 174 outputs the 2D map 304, for example, to the data storage 172. The method 400 ends at block 430.

As described herein, aspect of this disclosure relate to a method to accelerate large scale spherical geometric computations for objects 308, 310 on the surface of the earth, which are represented in the 3D map 302. The methods can involve projecting objects 308, 310 from a spherical surface of the 3D map 302 to a 2D plane of the 2D map 304. After the projection using the techniques described herein, objects 308, 310 located on a large area of a spherical surface can be accurately approximated to a location on a 2D plane within an effective area, so that any geometric computations (e.g. geodetic distances and the angles between objects 308, 310 which are very costly on the spherical surface) can be approximated as the computations on a 2D plane which are comparatively very efficient.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. A control system for an autonomous vehicle, comprising: a processor; and
a computer-readable memory in communication with the processor and having stored thereon computer-executable instructions to cause the processor to:
receive a three-dimensional (3D) map comprising a plurality of objects,
receive a route for navigating the autonomous vehicle,
determine, on a 2D map, an effective area in which a distortion of locations of the objects corresponding to a projection technique from the 3D map to the 2D map is less than a predetermined value,
determine a base point in the 3D map,
shift the objects in the 3D map based at least in part on the base point to generate a shifted 3D map, and
project the objects from the shifted 3D map to the 2D map,
wherein the objects are shifted and projected such that the route is within the effective area on the 2D map.

2. The control system of claim 1, wherein the memory further has stored thereon computer-executable instructions to cause the processor to:
set the base point as an origin of the shifted 3D map.

3. The control system of claim 2, wherein the memory further has stored thereon computer-executable instructions to cause the processor to:
determine a vector representing a shift of the base point from an original location to the origin,
wherein the shifting of the objects in the 3D map comprises shifting each of the objects by the vector.

4. The control system of claim 1, wherein the projecting of the objects is performed using one of the following projection techniques: Mercator, Universal Transverse Mercator (UTM), Equirectangular, Cassini, cylindrical, and pseudocylindrical projections.

5. The control system of claim 1, wherein:
the projecting of the objects is performed by the projection technique, and a shape and a size of the effective area are based on the projection technique used in the projecting of the objects.

6. The control system of claim 5, wherein the projection technique is a Mercator projection.

7. The control system of claim 6, wherein the effective area comprises an area a predetermined distance from an equator defined with respect to the base point.

8. A non-transitory computer readable storage medium having stored thereon instructions that, when executed, cause at least one computing device to:
receive a three-dimensional (3D) map comprising a plurality of objects,
receive a route for navigating of the autonomous vehicle;
determine, on a 2D map, an effective area in which a distortion of locations of the objects corresponding to a projection technique from the 3D map to the 2D map is less than a predetermined value;
determine a base point in the 3D map;
shift the objects in the 3D map based on the base point to generate a shifted 3D map;
project the objects from the shifted 3D map to the 2D map, wherein the objects are shifted and projected such that the route is within the effective area on the 2D map; and
navigate an autonomous vehicle using the 2D map.

9. The non-transitory computer readable storage medium of claim 8, further having stored thereon instructions that, when executed, cause at least one computing device to:
select the base point based on the route.

10. The non-transitory computer readable storage medium of claim 9, further having stored thereon instructions that, when executed, cause at least one computing device to:
determine a midpoint between a current location and a destination of the route, wherein the midpoint is set as the base point.

11. The non-transitory computer readable storage medium of claim 9, further having stored thereon instructions that, when executed, cause at least one computing device to:
determine a midpoint along the route, wherein the midpoint is set as the base point.

12. The non-transitory computer readable storage medium of claim 8, further having stored thereon instructions that, when executed, cause at least one computing device to:
calculate a geometric value based on locations of at least two of the objects in the 2D map,
wherein the navigating of the autonomous vehicle is based at least in part on the geometric value.

13. The non-transitory computer readable storage medium of claim 12, wherein the geometric value is a geodetic distance between the at least two of the objects.

14. The non-transitory computer readable storage medium of claim 12, wherein the geometric value is an angle between the at least two of the objects.

15. The non-transitory computer readable storage medium of claim 12, wherein the calculating of the geometric value based on the locations of at least two of the objects in the 2D map is more efficient than a corresponding calculation for the at least two of the objects in the 3D map.

16. A method comprising:
receiving a three-dimensional (3D) map comprising a plurality of objects;
receive a route for navigating of the autonomous vehicle,
determine, on a 2D map, an effective area in which a distortion of locations of the objects corresponding to a projection technique from the 3D map to the 2D map is less than a predetermined value,
determining a base point in the 3D map;
shifting the objects in the 3D map based on the base point to generate a shifted 3D map;
project the objects from the shifted 3D map to the 2D map, wherein the objects are shifted and projected such that the route is within the effective area on the 2D map; and
navigating an autonomous vehicle using the 2D map.

17. The method of claim 16,
wherein the route is located within the effective area.

18. The method of claim 17, further comprising:
selecting the base point based on the route such that the route is within the effective area.

19. The method of claim 18, wherein the base point is one of the following points: a midpoint between a current location and a destination, a midpoint along the route, the current location, or the destination.

* * * * *